Figure 5:
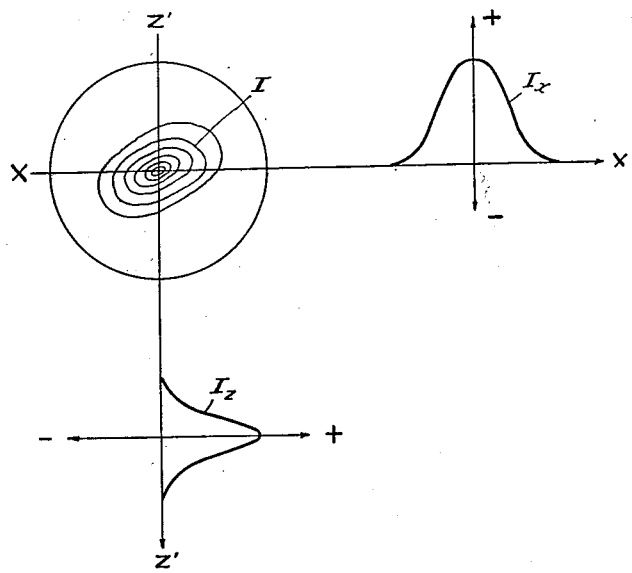

July 9, 1963 TOSHIO SHINADA ETAL 3,097,315
CRYSTAL VIBRATOR OF CONVEX LENS CONFIGURATION
HAVING OPPOSED CONVEX SURFACES
Filed April 5, 1960 4 Sheets-Sheet 1
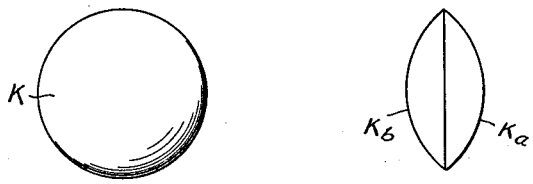
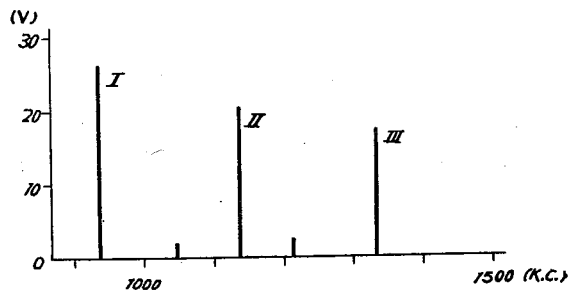
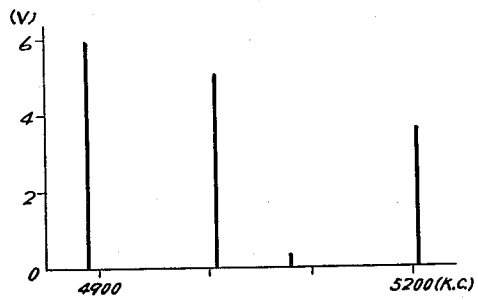
INVENTORS
TOSHIO SHINADA
AKIRA OHNUKI
BY
ATTORNEY July 9, 1963  TOSHIO SHINADA ETAL  3,097,315
CRYSTAL VIBRATOR OF CONVEX LENS CONFIGURATION
HAVING OPPOSED CONVEX SURFACES
Filed April 5, 1960  4 Sheets-Sheet 3

INVENTORS
TOSHIO SHINADA
AKIRA OHNUKI
BY
ATTORNEY

United States Patent Office 3,097,315
Patented July 9, 1963

1

3,097,315
CRYSTAL VIBRATOR OF CONVEX LENS CONFIGURATION HAVING OPPOSED CONVEX SURFACES
Toshio Shinada, 1399 Iruma-cho, Chofu-shi, and Akira Ohnuki, Chikaneso, 433 Taishido-machi, Setagaya-ku, both of Tokyo, Japan
Filed Apr. 5, 1960, Ser. No. 20,071
Claims priority, application Japan Apr. 9, 1959
4 Claims. (Cl. 310—9.7)

The present invention relates in general to a crystal vibrator and more particularly to a crystal vibrator having a high quality factor and a desired predominant resonance frequency with a substantial separation from possible adjacent resonance frequencies of various modes.

It is well-known that a crystal vibrator for use in a short wave band may possibly have a great number of higher order vibrations depending upon its boundary conditions. These higher order vibrations will often affect a practically detrimental effect upon the desired vibration condition. It is a matter of course that these higher order vibrations will widely vary in accordance with the contour of the vibrator since they are vibrations dependant upon the boundary conditions of said vibrator. As a crystal vibrator for use in a short wave band, an $R_1$ plate (AT cut plate) having good frequency-temperature characteristics has been commonly employed. This type of crystal plates has the thickness shear vibration as its principal vibration, which takes a vibration mode correlated closely with the thickness of the crystal plates. This type of crystal plates which has been used has mostly a contour of a rectangular plate or of a circular plate. With regard to the vibrator of the rectangular plate, there occur various modes of contoured vibrations having an integral number of nodes along the respective sides. The harmonic modes of vibrations having an odd number of nodes along the direction of the thickness are referred to and are well-known as overtone vibrations, whereas the vibrations having an integral number of nodes along the two sides of the plates are known as fundamental vibrations. Upon these vibrations, higher order of flexure vibrations are superposed, so that when the resonant effect of the crystal vibrators is measured by placing these crystal plates between electrodes to excite vibration, varying the exciting frequency successively and detecting the flow-in current or the terminal voltage, a great number of resonances can be found in the neighborhood of the principal vibration, as mentioned in the above. These resonant vibrations are the so-called higher order vibrations in general which cause a very detrimental effect in practice when the vibrators are used as oscillator, resonator or crystal filter element. These resonant vibrations must be differentiated from the higher order contoured thickness shear vibrations which are utilized in the crystal vibrator according to the present invention.

In the case of a crystal vibrator of circular plate form, also there occur higher order vibrations correlated with its diameter as well as its thickness just as in the case of the aforementioned crystal vibrator of rectangular plate form. However, with regard to the crystal vibrator of circular plate form, the analysis of vibration is very difficult. Especially, the higher order vibrations of the crystal vibrators of circular plate form for use in a frequency band higher than the short wave band are considered to be of very high orders, and therefore the aspect of these higher order vibrations will become quite different due to even a minute difference in the physical configuration of the vibrator caused through a working process.

Therefore, one object of the present invention is to provide a novel crystal vibrator having a desired predominant resonance frequency with a substantial separation from possible adjacent resonance frequencies of various modes.

Another object of the present invention is to provide a novel crystal vibrator of the above-mentioned character which is further characterized by a higher quality factor than that of the crystal vibrators in the prior art.

One feature of the present invention is the provision of a novel high Q crystal vibrator of convex lens configuration characterized in this that either the second or third order contoured thickness shear vibration of said vibrator is predominantly utilized for resonance.

Another feature of the present invention is the provision of a novel high Q crystal vibrator of convex lens configuration having opposed convex surfaces characterized in this that either the second or third order contoured thickness shear vibration of said vibrator is predominantly utilized for resonance.

Still another feature of the present invention is the provision of a novel high Q crystal vibrator of convex lens configuration having opposed convex surfaces characterized in this that substantially equal annular electrodes are coaxially and tightly attached onto the opposed surfaces of said vibrator in such manner that the electrical signals across said electrodes may be predominantly correlated with either the second or third order contoured thickness shear vibration of said vibrator.

A further feature of the present invention is the provision of a novel high Q crystal vibrator of the aforementioned character which is further characterized by lead portions for external connections of the electrodes which are attached on the respective vibrator surfaces and located substantially at diametrically opposed positions whereby a mechanical support as well as an electrical connection may be facilitated.

These and other features and advantages of the present invention will be more apparent after a perusal of the following specification taken in connection with the accompanying drawings, wherein FIG. 1 is a plan view of the crystal vibrator according to the present invention.

Figure 6:
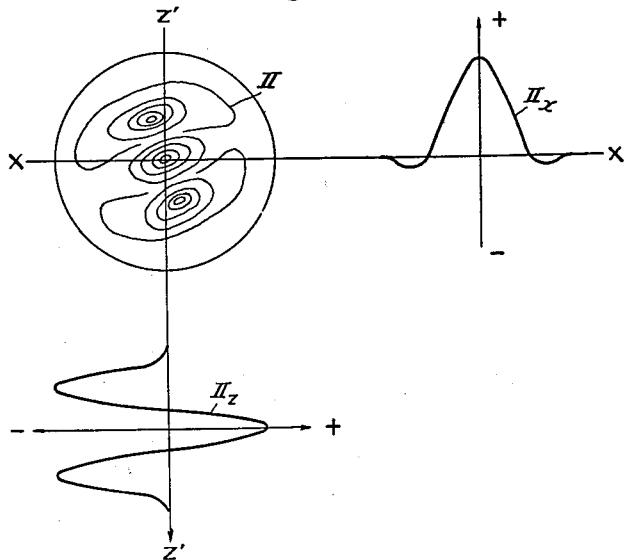
Figure 7:
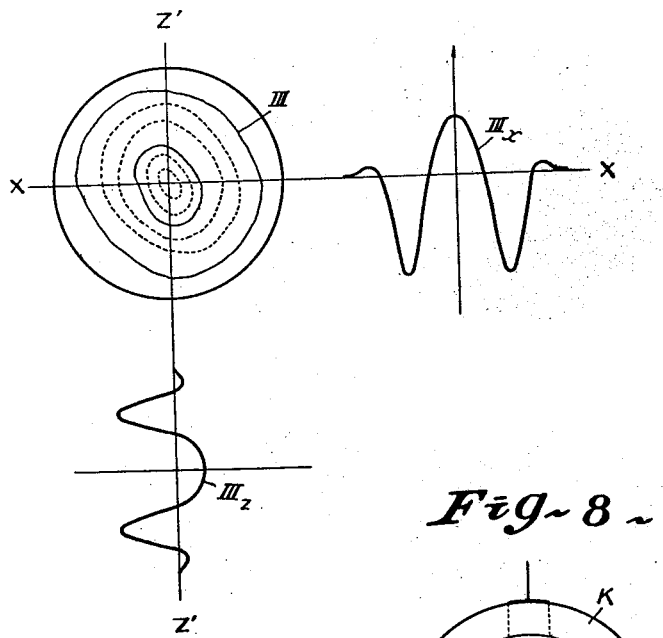
Figure 8:
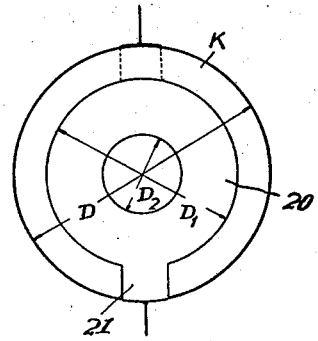
Figure 9:
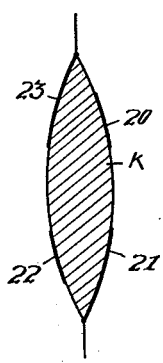
Figure 10:
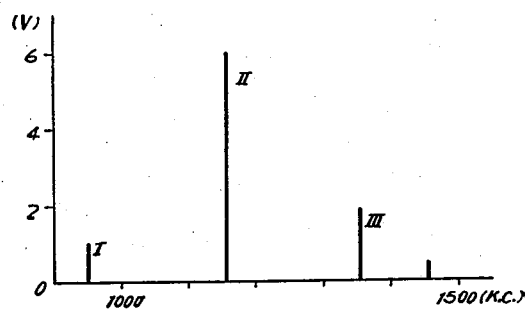
Figure 11:
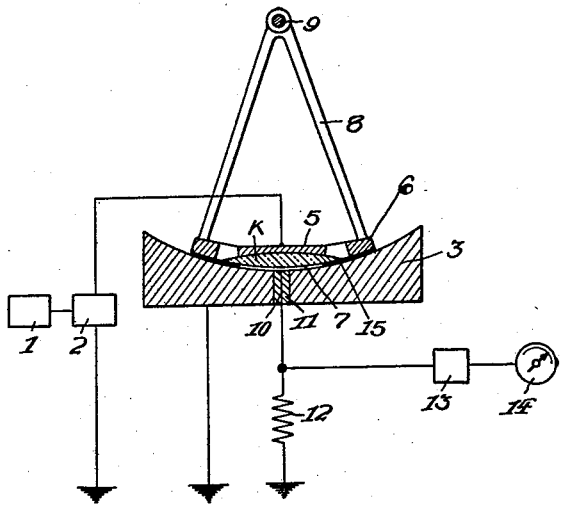

FIG. 2 is a side elevational view of the crystal vibrator in FIG. 1,

FIGS. 3 and 4 illustrate diagrams of resonant frequency spectrums obtained in the case of such crystal vibrators with entirely adhered electrodes, FIG. 5 is a diagrammatical view of the surface charge distribution associated with a most fundamental thickness vibration, FIGS. 6 and 7 respectively illustrate the surface charge distributions associated with the second and third order contoured thickness shear vibrations which may be predominantly excited by the electrodes arrangement according to the present invention, FIG. 8 is a plan view of one example of the electrodes arrangement according to the present invention, FIG. 9 is a longitudinal cross section view of the structure in FIG. 8, FIG. 10 illustrates the frequency spectrum of the higher order contoured thickness shear vibrations predominantly excited in the crystal vibrator embodying the present invention, and FIG. 11 is a schematic view of an apparatus for use in the measurement of the surface charge distribution on the crystal vibrator of convex lens configuration.

Referring now to FIGS. 1 and 2 of the drawings, a crystal vibrator of convex lens configuration having opposed convex surfaces embodying the present invention, is shown. Although a theoretical analysis of such type of crystal vibrator is difficult, the inventor has experimentally discovered the fact that only such higher order vibrations of the possible vibrations that they may be closely correlated with the radii of surface curvatures as well as the thickness which determines the principal vibration can appear predominantly. This may probably be deduced from the simplified boundary conditions of the novel crystal vibrator.

FIGS. 3 and 4 illustrate examples of experimental data taken at 950 kc. and 5000 kc. respectively, in the form of frequency spectrum taking a frequency along the abscissa and an exciting current along the ordinate, which are the results obtained by disposing electrodes over both of the entire surfaces of the crystal vibrator of convex lens configuration, varying the frequency of the exciting high frequency source and detecting the electric current flowing through the crystal vibrator. Since this resonant electric current has a close relation to the surface charge distribution, if the size and/or configuration of the electrodes are varied, the value of the resonant current will vary in accordance therewith.

The modes of the principal and higher order vibrations can be determined by measuring the surface charge density on the vibrating crystal resonator, on the basis of the theory of a piezo electric effect in which a surface charge density directly proportional to an elastic strain within a crystal plate appears. Such measurement of the charge density on the vibrator surface may be accomplished as by the measuring apparatus schematically shown in FIG. 11. More particularly, in the figure a vibrator K of convex lens configuration to be measured may be excited for vibration by means of an exciting high frequency which is applied between an upper electrode 5 and a metallic concave base electrode 3 from an exciting high frequency oscillator 1 through a filter 2, the internal surfaces of both electrodes having configurations conformed with the crystal vibrator. Member 6 is a frame for mounting a crystal vibrator K, which is supported by a very thin electrical insulating spacer 7 disposed on the lower surface of the frame. Frame 6 is held by arms 8, which in turn may swing around its center axis 9 to shift the crystal vibrator along the concave surface of base electrode 3 while exciting the vibrator. At the center of base electrode 3 is drilled a hole having a diameter of about 0.2–0.4 mm., within which a thin copper wire 10 is coaxially held and insulated from the electrode by means of an insulator 11, one end of the copper wire 10 being connected to a resistor 12. Across this resistor 12, then is generated a voltage directly proportional to the surface charge density on the crystal vibrator surfaces. This voltage will be amplified by a R.F. amplifier 13 and indicated by a recording instrument 14. By means of such type of experimental apparatus, it is possible to measure the charge density on the surface of a crystal plate and to determine the surface charge distributions for the respective principal and higher order vibrations.

The results obtained by measuring the surface charge pattern by means of the above-mentioned measuring apparatus when the crystal vibrator is vibrating at the mode I in FIGS. 3 and 4 are shown in FIG. 5, in which curve Ix in the right portion and curve Iz in the left lower portion represent the indication of surface charge distribution at the meter 14 in FIG. 11 along the X-axis and Z'-axis respectively. Furthermore, by repeating the similar measurement with regard to various directions other than X- and Z'-directions, it would become clear that the surface charge pattern I as shown in the left upper portion of the figure exists. Similarly, the vibrations of mode II in FIGS. 3 and 4 give the charge distribution as shown by curve IIx along X-direction and curve IIz along Z'-direction in FIG. 6, and thus the surface charge pattern II as shown in the same figure is obtained. It has been also noted that the surface charge distribution of the vibrations at the mode III as shown in FIGS. 3 and 4 takes the aspects as represented by III, IIIx and IIIz in FIG. 7. It is to be noted that in FIGS. 6 to 8, direction X—X represents the direction of X-axis of quartz crystal, and direction Z'—Z' represents the direction of Z'-axis which is an axis inclined from the so-called Z-axis of quartz crystal by about 34°53'.

The vibration as shown in FIG. 5 is the most general mode of thickness shear vibration, while those as shown in FIGS. 6 and 7 are the higher order contoured thickness shear vibration providing a very ample electric resonance effect and are stable for use in an oscillator as well as useful for a filter application because the capacitance ratio at these modes, i.e., the ratio of piezoelectric equivalent capacitance versus electrostatic capacitance is low and its electrical amplitude at series-parallel resonance is small. For illustration, in the case of a $R_1$ plate (AT cut) of plane circular configuration, the capacitance ratio amounts to about 1/200, whereas that of the principal vibration in a crystal vibrator of convex lens configuration has been experimentally determined to be within $1.4/10^3$–$1.55/10^3$, and that of the higher order contoured thickness shear vibrations within $6.7/10^4$–$9.2/10^4$.

As will be seen from the charge patterns in FIGS. 6 and 7, if the annular electrodes as shown in FIGS. 8 and 9 are disposed coaxially and tightly upon the both convex surfaces of the crystal vibrator of convex lens configuration, a portion bearing positive charge and another portion bearing negative charge may be separated, and therefore the electric current flowing in and out the crystal vibrator, i.e. the integrated value of the surface charge over the area of the electrodes increases resulting in a substantial decrease of the resonant resistance. Upon utilizing such type of electrode, the effect of the coexisting principal vibration will not appear in the electrical circuit because the area having a predominant surface charge is substantially inside of the annular electrodes. Furthermore, the effect of the coexisting higher than the third order contoured thickness shear vibration will also hardly appear because the portions bearing positive charge and other portions bearing negative charge in such surface charge pattern may be substantially offset within the area of the annular electrodes.

The annular electrode portion 20 in FIG. 8 may be tightly attached upon the surface of crystal K by the process of evaporation or sputtering. The dimensions of diameters $D_1$ and $D_2$ as shown in FIG. 8 will vary in accordance with the frequency to be employed and the radius of curvature for the crystal surface. Generally speaking, however, in the case of vibrations II in FIGS. 3 and 4, that is, the vibrations as shown in FIG. 6, the diameter $D_1$ in FIG. 8 is preferably within 0.78–0.83 times the peripheral diameter D of the crystal, and the diameter $D_2$ is preferably within 0.15–0.30 times the diameter D. While in the case of vibrations III in FIGS. 3 and 4, that is, the vibration as shown in FIG. 7, the diameter $D_1$ is preferably within 0.65–0.75 times the peripheral diameter D, and the diameter $D_2$ is preferably within 0.22–0.30 times the diameter D.

The lead portions 21 and 23 of the electrodes projecting from the annular portions 20 and 22 respectively substantially at diametrically opposed positions on the respective surfaces, are those for electrical connections. By taking such arrangement, a mounting of such type of crystal vibrator at the diametrically opposed edge portion is facilitated, and the mounting arms may also serve as terminals for electrical connection.

When the vibrations II in FIGS. 3 and 4, for example, are excited by means of the electrodes arrangement as shown in FIG. 8, other vibrations are rather suppressed and very remarkable effect is generated. FIG. 9 shows the graph representing the relation between the frequency and exciting current in one embodiment of the invention, wherein the diameters $D_1$ and $D_2$ in FIG. 8 are selected as 0.80 D and 0.20 D respectively As fully mentioned in the above, the electrodes arrangement according to the present invention enables the practical use of the crystal vibrator of convex lens configuration, and in addition such type of use will provide a crystal vibrator having a very high quality factor because of its smaller piezoelectric equivalent capacitance.

Since many changes could be made in the above construction and many apparently widely different embodiments of this invention could be made without departing from the scope thereof it is intended that all matter contained in the above description or shown in the accompanying drawings shall be interpreted as illustrative and not in a limiting sense.

What we claim is:

1. A high Q crystal vibrator of convex lens configuration, said vibrator having opposed surfaces of similar convex curvature to each other characterized in that substantially equal annular electrodes are coaxially and tightly attached onto said opposed surfaces of the vibrator in such manner that the electrical signals across said electrodes may be predominantly correlated with the second order contoured thickness shear vibration of said vibrator.

2. A high Q crystal vibrator of convex lens configuration, said vibrator having opposed surfaces of similar convex curvature to each other with the peripheral diameter of D, characterized in that substantially equal annular electrodes having an outer diameter of 0.78–0.83 D and an inner diameter of 0.15–0.30 D are coaxially and tightly attached onto said opposed surfaces of the vibrator in such manner that the electrical signals across said electrodes may be predominantly correlated with the second order contoured thickness shear vibration of said vibrator.

3. A high Q crystal vibrator of convex lens configuration, said vibrator having opposed surfaces of similar convex curvature to each other with the peripheral diameter of D, characterized in that substantially equal annular electrodes having an outer diameter of 0.65–0.75 D and an inner diameter of 0.22–0.30 D are coaxially and tightly attached onto said opposed surfaces of the vibrator in such manner that the electrical signals across said electrodes may be correlated with the third order contoured thickness shear vibration of said vibrator.

4. A high Q crystal vibrator of convex lens configuration, said vibrator having opposed surfaces of similar convex curvature to each other characterized in that substantially equal annular electrodes are coaxially and tightly attached onto said opposed surfaces of the vibrator in such manner that the electrical signals across said electrodes may be predominantly correlated with the third order contoured thickness shear vibration of said vibrator.

References Cited in the file of this patent

UNITED STATES PATENTS

| | | |
|---|---|---|
| 2,159,796 | Hawk | May 23, 1936 |
| 2,343,059 | Hight | Feb. 29, 1944 |
| 2,468,301 | Mason | Apr. 26, 1949 |
| 2,486,916 | Bottom | Nov. 1, 1949 |

OTHER REFERENCES

"Proceedings I.R.E.," September 1951, pages 1086–1087.